United States Patent
Lynch et al.

(10) Patent No.: US 6,928,050 B2
(45) Date of Patent: Aug. 9, 2005

(54) PROTECTED SWITCHING RING

(75) Inventors: Robert Leroy Lynch, Raleigh, NC (US); David Stephen Griswold, Chapel Hill, NC (US); Glenn Russell Swope, Raleigh, NC (US); Prayson Will Pate, Durham, NC (US)

(73) Assignee: Overture Networks, Inc., Morrisville, NC (US)

( * ) Notice: Subject to any disclaimer, the term of this patent is extended or adjusted under 35 U.S.C. 154(b) by 0 days.

(21) Appl. No.: 10/839,864

(22) Filed: May 6, 2004

(65) Prior Publication Data

US 2004/0223503 A1 Nov. 11, 2004

Related U.S. Application Data

(60) Provisional application No. 60/490,764, filed on Jul. 29, 2003, and provisional application No. 60/468,325, filed on May 6, 2003.

(51) Int. Cl.[7] ............................................. G01R 31/08
(52) U.S. Cl. ...................................... 370/224; 370/403
(58) Field of Search ............................... 370/220, 256, 370/221, 222, 401–408, 216–217, 230, 228; 714/2, 7; 340/825.01, 825.02; 709/251

(56) References Cited

U.S. PATENT DOCUMENTS

| | | |
|---|---|---|
| 4,209,666 A | 6/1980 | Lawton |
| 4,354,267 A | 10/1982 | Mori et al. |
| 4,462,099 A | 7/1984 | Braun |
| 4,527,270 A | 7/1985 | Sweeton |
| 4,538,264 A | 8/1985 | Bahr et al. |
| 4,573,044 A | 2/1986 | McConachie et al. |

(Continued)

FOREIGN PATENT DOCUMENTS

| | | |
|---|---|---|
| EP | 0052390 A1 | 10/1981 |
| EP | 0494695 A1 | 7/1992 |
| EP | 0519712 A2 | 12/1992 |
| EP | 0403763 B1 | 9/1994 |
| EP | 0472380 B1 | 6/1999 |
| JP | 07095227 A | 4/1995 |

OTHER PUBLICATIONS

Web pp. 1–10 printed May 10, 2004 entitled "How Ring Redundancy Works" (2001): http://industrialnetworking.com/support/tutorials/How_Ring_Redundancy_Works.html.
Protected Switching Ring (PSR), Overture Networks, Inc. Jan. 26, 2004 (4 pages); OvertureNetworks.com/products/tech_psr.shtml.

(Continued)

Primary Examiner—Chau Nguyen
Assistant Examiner—Robert W. Wilson
(74) Attorney, Agent, or Firm—The Eclipse Group; Kevin E. Flynn

(57) ABSTRACT

Normal 802.3 Ethernet requires a tree topology. If a ring or a loop exists, then packets will be forwarded around the ring indefinitely. If the ring is broken, then there is no possibility of packets being propagated forever. This invention shows how to quickly impose a virtual break in the ring such that all nodes can communicate with each other, and how to remove the virtual break when a real failure occurs. This is accomplished by placing intelligent nodes on the ring that work together to virtually break and restore the ring. An embodiment is disclosed that handles a unidirectional break in a communication link. This abstract is provided as an aid to those performing prior art searches and not a limitation on the scope of the claims.

48 Claims, 11 Drawing Sheets

U.S. PATENT DOCUMENTS

| | | | |
|---|---|---|---|
| 4,594,709 A | | 6/1986 | Yasue |
| 4,633,468 A | | 12/1986 | Skatrud et al. |
| 4,654,857 A | | 3/1987 | Samson et al. |
| 4,683,563 A | | 7/1987 | Rouse et al. |
| 4,709,365 A | | 11/1987 | Beale et al. |
| 4,800,559 A | | 1/1989 | Florea et al. |
| 5,003,531 A | | 3/1991 | Farinholt et al. |
| 5,113,398 A | | 5/1992 | Howes |
| 5,136,589 A | | 8/1992 | Konishi |
| 5,218,600 A | | 6/1993 | Schenkyr et al. |
| 5,317,198 A | | 5/1994 | Husbands |
| 5,410,542 A | | 4/1995 | Gerbehy et al. |
| 5,446,725 A | | 8/1995 | Ishiwatari |
| 5,469,503 A | | 11/1995 | Butensky et al. |
| 5,491,696 A | | 2/1996 | Nishimura |
| 5,495,472 A | | 2/1996 | Ohara |
| 5,532,862 A | | 7/1996 | Tada et al. |
| 5,651,000 A | | 7/1997 | Lee et al. |
| 5,737,370 A | | 4/1998 | Hetzel |
| 5,781,530 A | * | 7/1998 | Segal .................. 370/220 |
| 5,796,720 A | | 8/1998 | Yoshida et al. |
| 5,944,798 A | * | 8/1999 | McCarty et al. ............ 709/251 |
| 5,959,990 A | | 9/1999 | Frantz et al. |
| 6,052,210 A | | 4/2000 | Nathan |
| 6,111,853 A | | 8/2000 | Goodman |
| 6,199,174 B1 | | 3/2001 | Norizuki et al. |
| 6,307,652 B1 | | 10/2001 | Fassih-Nia et al. |
| 6,430,151 B1 | | 8/2002 | Glas et al. |
| 6,581,126 B1 | | 6/2003 | Regula |
| 6,678,241 B1 | | 1/2004 | Gai et al. |
| 6,717,909 B2 | * | 4/2004 | Leroux et al. ............. 370/228 |
| 6,717,922 B2 | | 4/2004 | Hsu et al. |
| 6,766,482 B1 | | 7/2004 | Yip et al. |
| 6,813,413 B2 | | 11/2004 | Bisson et al. |
| 2003/0039243 A1 | | 2/2003 | Parker |
| 2003/0099191 A1 | | 5/2003 | Kim |
| 2003/0223379 A1 | | 12/2003 | Yang et al. |
| 2004/0132409 A1 | | 7/2004 | Arnold et al. |

OTHER PUBLICATIONS

Empower legacy SONET/SDH and TDM networks for metro Ethernet Revenues, Overture Networks, Mar. 14, 2003 http://www.overturenetworks.com.

Overture Expands Access Options for Smaller Firms, Jim Duffy, Network World, Jan. 26, 2004; www.nwfusion.com/News/2004/0126overture.html.

Extreme Networks' Ethernet Automatic Protection Switching (EAPS) Version 1, S. Shah & M. Yip, published as RFC 3619 by Network Working Group, www.ietf.org/rfc/rfc3619.txt.

Fast Reroute Extensions to RSVP-TE for LSP Tunnels (draft-ieft-mpls-rsvp-1sp-fastreroute-03.txt); P. Pan et al.; Expiration Dec. 2003, published as Internet-Draft by Internet Engineering Task Force (IETF).

Fast Reroute Extensions to Constraint Based Routed Label Distribution Protocol (draft-vijay-mpls-crldp-fastreroute-02.txt); Vijayanand.; Expiration May 2003, published as Internet-Draft by Internet Engineering Task Force (IETF).

IEEE Standard 802.1D 1998 Edition "Information Technology—Telecommunications and Information Exchange Between Systems—Local and metropolitan Area Networks—Common Specifications—Part 3: Media Access Control (MAC) Bridges" ISO/IEC 15802-3; ANSI/IEEE Std 802.ID, Sponsored by the LAN/MAN Standards Committee of the IEEE Computer Society, pages cover to xix, 50–54, and 78–109.

IEEE Standard 802.1 w–2001 "IEEE Standard for Local and metropolitan area networks—Common Specifications Part 3: Media Access Control (MAC) Bridges—Amendment 2: Rapid Reconfiguration" Sponsor LAN/MAN Standards Committee of the IEEE Computer Society.

"Industrial Fiber Optic Networking", Publication: RM0900515 Rev. Apr. 2004; Weed Instrument Company, Inc., (36 pages) www.weedinstrument.com.

* cited by examiner

PROTECTED SWITCHING RING

This application claims priority to U.S. Provisional Application 60/490,764 filed Jul. 29, 2003 and U.S. Provisional Application 60/468,325 filed May 6, 2003. This application incorporates by reference these two provisionals.

FIELD OF THE INVENTION

This invention relates to communication networks, and more particularly, to an apparatus and method for Ethernet equipment in a ring topology.

BACKGROUND OF THE INVENTION

As Ethernet is deployed in Metro and Access networks, and services are offered on these networks, there is a desire to maintain SONET-like resiliency (i.e. recover from a fault in less than 50 ms). One common means of providing resiliency is with a ring topology. However, Ethernet switches will not work properly if there is a ring or loop in the topology. Protocols such as IEEE 802.1d Spanning Tree Protocol (STP) or IEEE 802.1w Rapid Reconfiguration were invented to detect and remove loops. However, they are slow and cannot achieve path restoral within 50 ms as desired.

To solve this problem, the IEEE is working on 802.17 Resilient Packet Ring (RPR). Others are looking at Multi-protocol Label Switching (MPLS) with Fast Reroute capabilities. Both of these approaches are quite complex. RPR requires a new Media Access Control (MAC) Layer, and MPLS requires extensive signaling. Because of the complexities, these approaches will drive up the cost of the nodes on the ring.

This invention introduces a new way (Protected Switching Ring or "PSR") of providing protection for Ethernet deployed in a ring topology with resiliency that does not require a new MAC layer, and that can be built using low cost Ethernet chips and methods.

This invention differs from some previous inventions. One of interest is described in U.S. Pat. No. 6,430,151, granted on Aug. 6, 2002. PSR is similar to '151 in that:

Both are based on nodes arranged in a ring topology.

Both aim to overcome the limitations of STP.

Both describe making or breaking a ring based on the passage or blockage of test messages.

Both have two classes of nodes on the ring, one of which is a controller or master.

Some of the differences between PSR and the teachings of the '151 include:

'151 is composed of bridging nodes that do dynamic layer 2 learning, while PSR is composed of nodes that are configured to switch (add and/or drop) packets based on a VLAN tag.

'151 has a single redundancy manager (RM), while PSR can support dual redundancy Ring Arbiters (RA). PSR can operate in the presence of a failed RA, thus providing a higher level of availability.

The nodes in '151 learn an association between ports and MAC addresses for ring traffic. When the topology changes, the RM of the '151 must send a "flush" message to tell the nodes to clear their databases. In contrast, the Ring Relay ("RR") nodes in PSR always send messages (both data and control) around the ring in both directions, thus removing half of the propagation delay from the recovery time. In this way, a flush command is not needed to redirect traffic on the ring, thus reducing the recovery time.

'151 can cause packets to be duplicated during a restoral as there will be a ring upon restoral. Duplication of packets violates the IEEE 802.3 specifications. The state machines in PSR prevent this.

Since nodes in PSR are not performing learning for ring traffic, there is less overhead and a higher packet rate can be sustained for a given amount of processing power.

Another approach to the problem is described in U.S. Pat. No. 4,354,267. The '267 patent describes a set of homogeneous layer 2 devices arranged in a ring. Each node in '267 forwards packets around the ring, and the originator removes the packet.

Some of the differences between PSR and the teachings of the '267 include:

'267 assumes that data sent that is sent one way around the ring makes it all the way around. In layer 2 systems, each node may pick off packets addressed to it, so this assumption is not valid.

'267 assumes that each node can repair a fault. See claim 1 in column 10, starting at line 34, and claim 5, in column 12, starting at line 38. In contrast, PSR concentrates the recovery mechanism in just two nodes.

SUMMARY OF THE DISCLOSURE

Normal 802.3 Ethernet requires a tree topology. If a ring or a loop exists, then packets will be forwarded around the ring indefinitely. STP was created to solve this problem by detecting and breaking any rings. If the ring is broken, then there is no possibility of packets being propagated forever.

This invention shows how to virtually break the ring such that all nodes can communicate with each other, and how to remove the virtual break when a real failure occurs. This is accomplished by placing intelligent nodes on the ring that work together to virtually break and restore the ring.

In PSR, the nodes communicate between and among themselves to determine when and where a break occurs. The relevant state machines for a preferred embodiment of the present invention are contained within this disclosure.

DESCRIPTION

Figure 1:
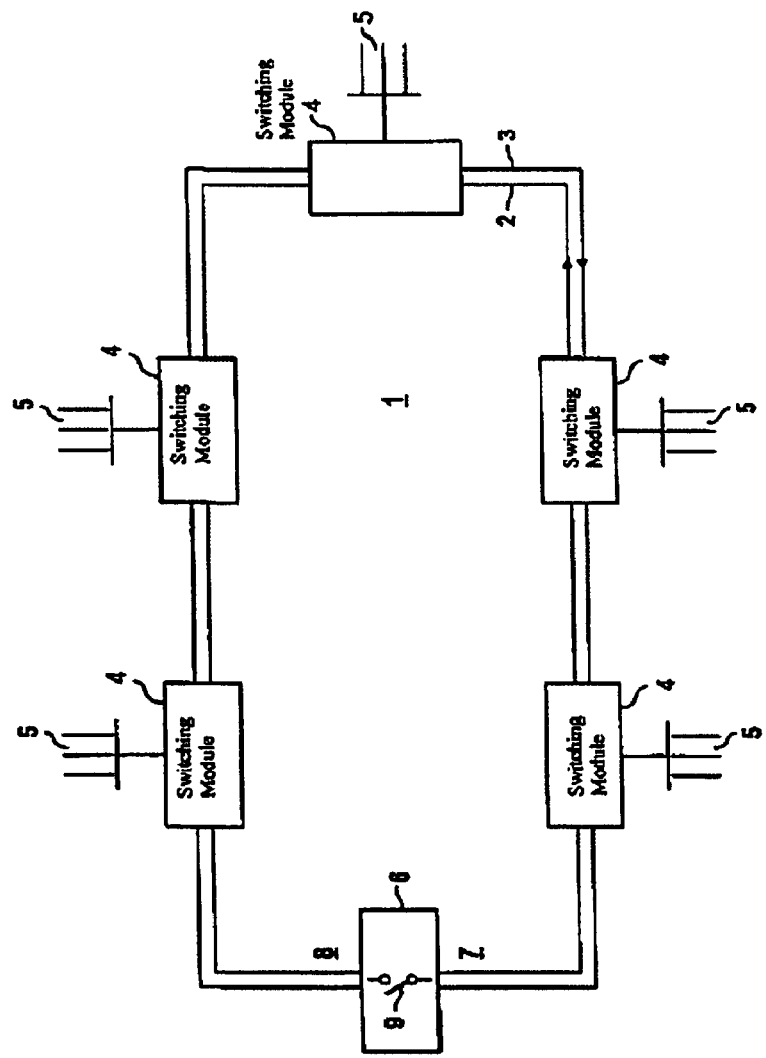
FIG. 1 shows an example of prior art.

The present invention will now be described more fully hereinafter with reference to the accompanying drawings, in order to disclose selected embodiments. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Overview

The Protected Switching Ring (PSR) enables building of partial or full ring topologies from low-cost Ethernet equipment, while providing for sub-50 millisecond recovery from equipment or link faults. PSR nodes support the transport of point-to-point port-switched connections across the ring topology. During normal, non-fault operation, one port in the ring will be blocked to user traffic, thus preventing a loop. In the event of a fault in the ring, the blocked port will be unblocked, allowing access to all nodes on the ring.

Two topologies using the present invention are described below. The first topology is the PSR Full Ring ("FR") configuration that consists of a full ring of PSR nodes. Port-switch connections can be configured between any two subscriber ports on the ring. The second topology is the PSR High-Availability (HA) configuration. This configuration provides a partial-ring extension of a SONET or RPR ring, or a partial-ring addition to existing layer-2 switching equipment. In either case, a path is engineered through the existing equipment to complete the path for the PSR protocol traffic and user data.

PSR nodes are designated as Ring Arbiters or Relays. Each ring contains two Ring Arbiters. The Ring Arbiters communicate with a "hello" protocol to coordinate the blocking or forwarding of user traffic. In a preferred embodiment, the PSR Ring Arbiter ports take on the role of master or slave on the ring according to their relative node priority. In a preferred embodiment, the priority could be a unique identifier, such as a MAC address. In a highly preferred embodiment, the priority can be the concatenation of an operator-configurable priority with the MAC address (or other unique identifier) such that the priorities of two nodes would never be equal. In either of these preferred embodiments, the reception of a HELLO with the same priority would indicate a ring with only one arbiter, where that arbiter was receiving its own HELLOs.

In general, during normal fault-free operation of two Ring Arbiters, the slave Ring Arbiter will block one of its ring ports in order to terminate the ring loop. A ring may contain one or more Relay nodes. The Relay nodes may be distributed in any fashion around the ring, although some benefit is provided by distributing approximately equal numbers of Relays on each "side" of a full-ring configuration.

In addition to the "hello" protocol, each node performs a "discovery" protocol that allows each node to know about all the other nodes on the ring. The discovery protocol is also used to detect persistent ring faults and to generate the associated alarms. Both protocols operate at layer 2, employing reserved multi-cast MAC addresses.

IP connectivity between all ring nodes is accomplished over a control VLAN used only for that purpose. This allows Telnet and a UDP-based signaling protocol to operate between any nodes on the ring. (An explanation of Telnet is not critical to the understanding of the present invention but Telnet is a terminal emulation program used with TCP/IP networks that allows remote entry of commands that are treated as if input at the network device.) Bridging techniques are used to provide the connectivity for these IP-based applications; all user traffic is transported across the ring using port-switching. As such, all user traffic is point-to-point across the ring; traffic from a subscriber-port/VLAN on one node is connected to a subscriber-port/VLAN on another node.

An additional embodiment of the present invention addresses a partial failure of a network link so that the communication link is lost in only one direction. Yet, another embodiment uses a single arbiter to provide a high reliability connection of user ports to an existing network ring by creating a switching ring with the arbiter and two network ring access points.

Ring Nomenclature

When the PSR is configured, two ports are designated as the ring ports and may be called East and West ports. Also the node type is given to distinguish Ring Arbiter types and Relays (also called Ring Relays or Relay Nodes). The Ring Arbiter type may be High-Availability (HA) or Full-Ring (FR). The two Ring Arbiters on the ring must be of the same type. When speaking of a specific ring port, the partner port refers to the other port of the pair of ring ports on that Ring Arbiter or Ring Relay.

An additional distinction is made in the case of a HA Ring Arbiter. The port of the HA Ring Arbiter connected to the existing SONET or RPR ring is designated the "extension side" (ES) port. This port interfaces with the existing equipment for which we wish to extend a ring segment. The other Ring Arbiter port is referred to as the "ring side" port. It is connected to a string of one or more Ring Relays or directly to the other Ring Arbiter.

HELLO Protocol

Each PSR Ring Arbiter periodically issues a "HELLO" protocol packet out each ring port. In a preferred embodiment each PSR Ring Arbiter issues a "HELLO" protocol packet out each ring port every 10 milliseconds. The packet uses a special multicast MAC address as the destination address. The Relay nodes are configured to have the data plane pass the packet from one ring port to the other, so a Relay node adds only a small amount of delay as the packet moves from one Ring Arbiter to the other. The remote Ring Arbiter node will terminate the packet and send the packet to the control plane. The control plane uses the presence of the new packet and some control information to drive its state machine for the Ring Arbiter ports. The absence of a new HELLO message for 30 milliseconds constitutes a ring timeout. If the timeout persists for 1.5 seconds, a ring failure is declared and the appropriate alarm is issued.

The significantly longer period used as a trigger for a ring failure keeps a short intermittent problem from being deemed ring failures though the problems may be handled by the declaration of ring timeouts. In one embodiment, the ring failure is detected by loss of Discovery messages, described below. One of skill in the art could implement the ring failure to be based on the absence of HELLO messages rather than Discovery messages. One of skill in the art would appreciate that the HELLOs are not processed at the RR nodes, whereas the Discovery messages are. HELLOs therefore propagate around the ring faster than Discovery messages. A timeout threshold for loss of HELLOs can be set lower than an equivalent threshold for Discovery messages.

A ring timeout causes the state machines to transition a slave Ring Arbiter port to a FORWARDING state. This response ensures that any loss in connectivity due to a single failure across the ring will only persist for 50 milliseconds or less.

In a preferred embodiment the sequence number in the HELLO PDU is used at the receiving Ring Arbiter to distinguish the arrival of a new HELLO PDU. Those of skill in the art will recognize that other methods could be employed to detect the arrival of a new HELLO PDU. The Relay nodes do not process the HELLO PDUs; they only forward them between ring ports.

Discovery Protocol

The discovery protocol is an optional protocol that can be implemented in order to add functionality. Note since the discovery protocol is not a necessary requirement of the state machines for any of the Ring Arbiters, Protected Switching Rings in accordance with the teachings of the present invention could be implemented without implementing the discovery protocol.

The discovery protocol also uses a special multicast destination MAC, but runs every 500 milliseconds. The discovery PDU is originated by the Ring Arbiters, appended to by intervening Relay nodes, and terminated at the remote Ring Arbiter. As the discovery PDU traverses the path between Ring Arbiters, each node in the path appends its management IP address, egress port for the PDU, and node type to the PDU. Since the discovery messages are flowing in both directions on the ring, each node on the ring can see the path of nodes to each Ring Arbiter on each of its ring ports. For example in FIG. 2, the Ring port 210 will receive a discovery message on one port directly from the RA 200 and will receive the other discovery message from the RA 225 after that discovery message passes through the ring port 220. Thus after receiving the two discovery PDUs, each ring port knows the identity of all devices between the ring port and each RA.

Additionally, as each Ring Arbiter constructs the discovery message to send out a ring port, the Ring Arbiter adds the completed node list received at its partner port. This allows every node in the PSR to know all the IP addresses of the nodes in the ring.

In the event of a ring or node failure, the Relay nodes closest to the point of failure will originate the discovery message. In other words, if a relay fails to receive a discovery PDU from its upstream neighbor (due to a link or node failure), then the relay will create and send a discovery PDU in the downstream direction. All downstream nodes will detect that the Ring Arbiter is no longer the originator of the discovery message and declare a fault alarm. If a node either does not receive a Discovery message or receives a Discovery message without a ring Arbiter as the originator, a ring failure is declared after 1.5 seconds. The fault is cleared when the node receives a Discovery message with a ring Arbiter as the originator.

PSR Data Plane for User Traffic

User traffic may enter and leave the PSR at any Ring Arbiter or relay node. A PSR connection defines the entry and exit points for a full-duplex flow of user traffic across the ring. This flow is defined by a pair of port/VLAN ID/PSR Node Address tuples. The connection defines a path through the ring between 2 user ports, each residing on a PSR node, configured to carry the user traffic for specific or all VLAN IDs on that port.

As the user traffic enters the ring, a ring tag is added to the packet. The ring tag is a VLAN tag and is unique on the ring. The ring tag defines a given connection between two ring nodes. At the egress node of the PSR connection, the ring tag is removed from the frame before forwarding to the user port. In this way, the VLAN tags present in the user data are transparently transported across the ring. VLAN IDs used on one user port do not interfere with IDs used on another user port.

A PSR node is either an endpoint of a given connection or a transit node for that connection. A PSR node is an endpoint for a connection if one of its user ports is specified in the definition of the given connection. The node is a transit node if neither endpoint of the connection resides on the node. In either case, a switch table used by the data plane is configured on each PSR node to either terminate one end of a given connection or to act as a transit node for that connection. When a node is a transit node for a given connection, the node simply transfers frames from one ring port to the other, based on the ring tag, without modification. When a node is an endpoint node for a given connection, the data plane directs the data arriving on a ring port to the correct user port and removes the ring tag. Conversely, the node's data plane directs user packets from the given user port with the given VLAN ID to the ring ports, adding the correct ring tag in the process.

PSR Control Plane for Control Traffic

A PSR requires a mechanism to transport HELLO PDUs, discovery PDUs, and IP traffic for ring control applications between PSR nodes. While user traffic transport is transported using switching techniques, in a preferred embodiment the control functions are transported using bridging techniques. By using bridging techniques, full PSR node control connectivity is attained with all nodes appearing on the same IP subnet. This makes configuration much simpler.

One ring tag is reserved for PSR control traffic. The data plane uses learning procedures and forwarding table lookups to direct control traffic to the correct PSR node. Note that the use of learning procedures and forwarding table lookups for the direct control traffic imposes an overhead burden that is orders of magnitude smaller than the overhead needed to use learning techniques for user data traffic. In the preferred embodiment the HELLO and discovery messages use known multicast MAC addresses and thus do not add additional learned database entries to be forwarded. Flushing is not needed for the control traffic upon failure, recovery, or reconfiguration of the ring, as the new port entries are learned from bidirectional traffic after a short period of time.

While the use of bridging for control traffic is preferred, it is not required in order to implement the present invention. The present invention could be implemented to use switching techniques for data packets and some or all types of control traffic. Care must be taken in creating this variation that the control traffic described in this application as passing when data packets are blocked, must be allowed to pass.

EXAMPLE RECOVERY FOR FULL RING

Fault Detection

Figure 3:
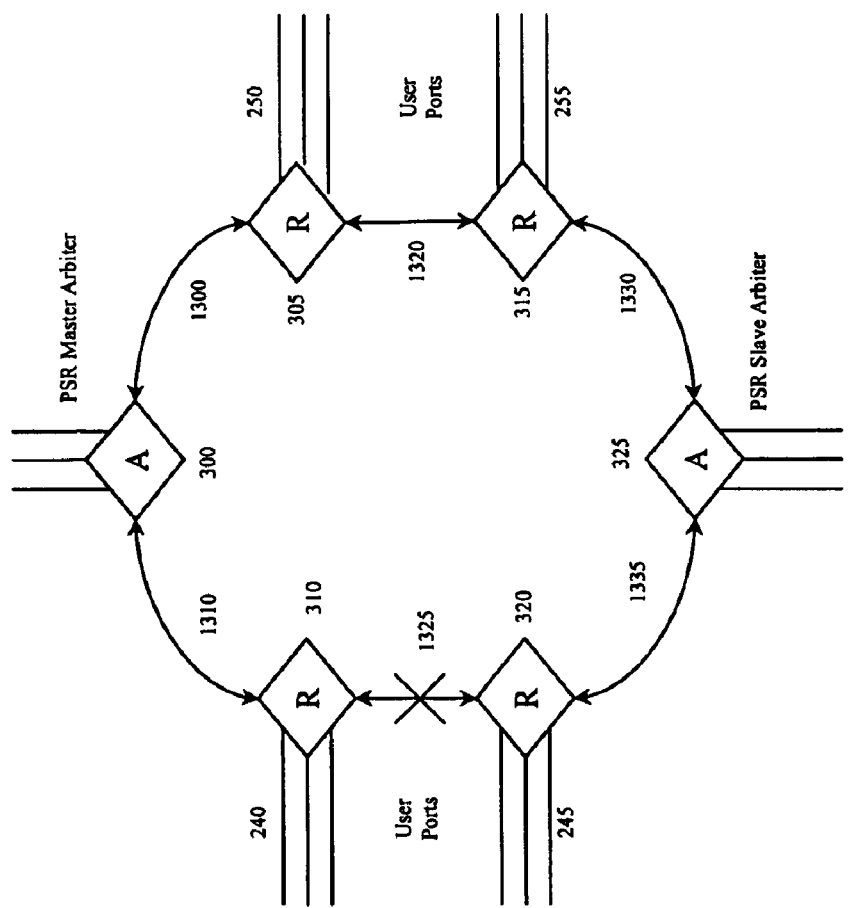
FIG. 3 shows an example Protected Switching Ring in the Full Ring mode during a failure.

FIG. 3 shows a full ring where the link 1325 fails between nodes 310 and 320. This means that RA nodes 300 and 325 are unable to communicate with each other via the left hand side of the ring. Prior to the failure, assume that RA node 325, the slave Ring Arbiter, is blocking traffic on link 1330 (thus no counterclockwise communication on 1330) and forwarding traffic on link 1335. Also, any user traffic arriving on link 1330 is discarded. So clockwise traffic on 1330 is discarded at the 1330 side of RA 325. Communications to subscriber ports connected to RA 325 reach those ports through counterclockwise communication over link 1335 to RA 325.

Assuming RA node 300 was the master Ring Arbiter, when RA node 325 detects the loss of communication; RA node 325 will start forwarding traffic to the right hand side of the ring onto link 1330 and accepting user traffic arriving on link 1330 and relaying the traffic to link 1335 and to the subscriber ports of RA 325. This will restore communications between all of the nodes on the ring. At this point, RA 325 is forwarding traffic on both ring ports. The ring port that is facing link 1335 is in MASTER FORWARDING state, and the ring port that is facing link 1330 is in SLAVE FORWARDING state.

Link Restoral

When link 1325 is restored, RA node 325 needs to block one of its ring ports to prevent a loop in the ring. When RA node 325 receives the first HELLO on link 1335 (due to the restoration of link 1325), RA node 325 will see that the partner port to the port that is facing link 1335 is in SLAVE FORWARDING state. RA node 325 will move the port that is facing link 1335 to the BLOCKING state. Assuming that the Ring ports of nodes 310 and 320 connected to link 1325 went to an OPER DOWN state during the failure, the TIMING state in the relay nodes 310 and 320 will prevent forwarding of traffic until the slave Ring Arbiter has time to switch from MASTER FORWARDING to BLOCKING on the 325 side of the Ring Arbiter. OPER DOWN is an indication from the physical or transport layer that a link is not operational. It is normally based on the detection of loss or corruption of the incoming electrical or optical signal.

The advance to the TIMING state is triggered by the reception of a HELLO message. This TIMING state delay in the resumption of operation of relay nodes 310 and 320 prevents duplicate packets from reaching a given destination when the failed link is restored. To illustrate the value of this delay in the Ring Relay ports, consider a message coming to Ring Relay 305 to a subscriber port connected with Ring Relay 310 just before link 1325 is restored. Ring Relay 305 operating normally will send the same message onto link 1300 and link 1320. The message traveling counterclockwise reaches Ring Relay 310 in a conventional way. The message traveling clockwise to Ring Relay 310 will pass through Ring Arbiter 325 onto link 1335 as the West Port is operating in MASTER FORWARDING. When link 1325 is restored, there is a path for a duplicate message to cross link 1325 to Ring Relay 310. This potential is eliminated if the Ring Relay ports undergo a suitable delay between receipt of the first HELLO and the ultimate state of FORWARDING. Note that the HELLO messages from Ring Arbiter 300 to Ring Arbiter 325 and from Ring Arbiter 325 to Ring Arbiter 300 will pass over link 1325 as soon as it is restored as the HELLO messages are not blocked at any port in any state.

The preferred embodiments disclose using a timing delay to ensure that a port progressing from OPER DOWN to operational delays sending data packets long enough for the slave arbiter to impose a virtual break. One of skill in the art will recognize that the use of the timer could be replaced by a control signal sent by the slave arbiter after it has successfully imposed the virtual break. In either case, the port does not go to fully operational until after the virtual break has been imposed to preclude the creation of a ring for data packets.

EXAMPLE RECOVERY FOR HA RING

Fault Detection

Figure 4:
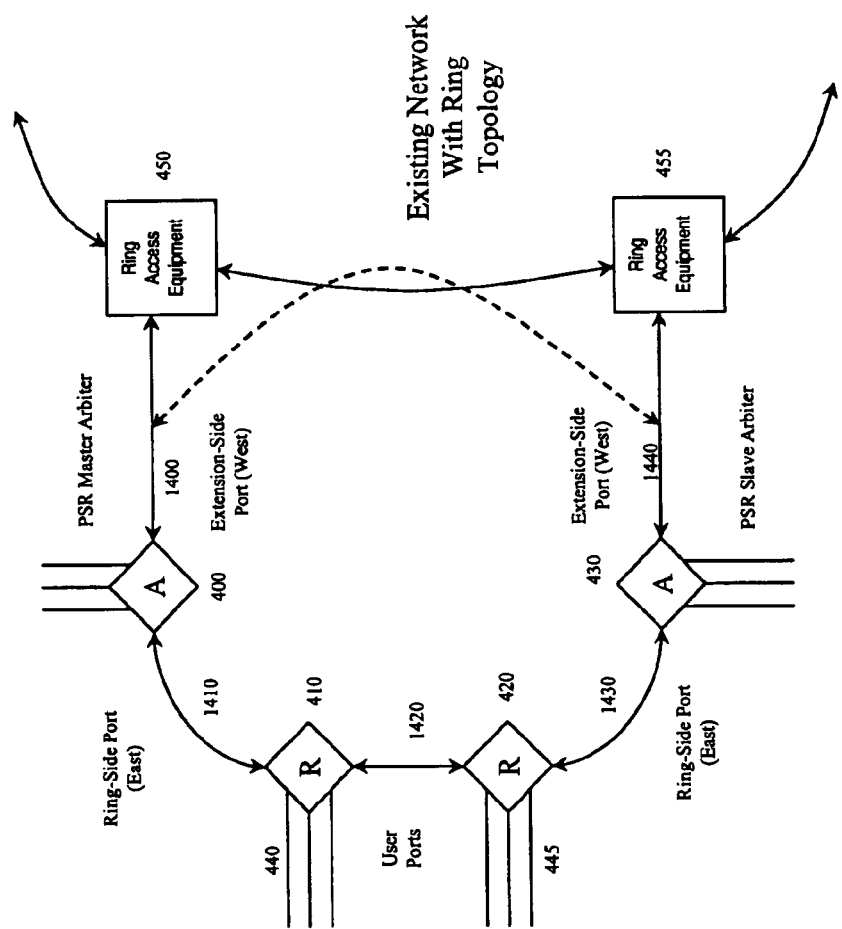
FIG. 4 shows an example Protected Switching Ring in the High Availability mode in normal operation.
Figure 5:
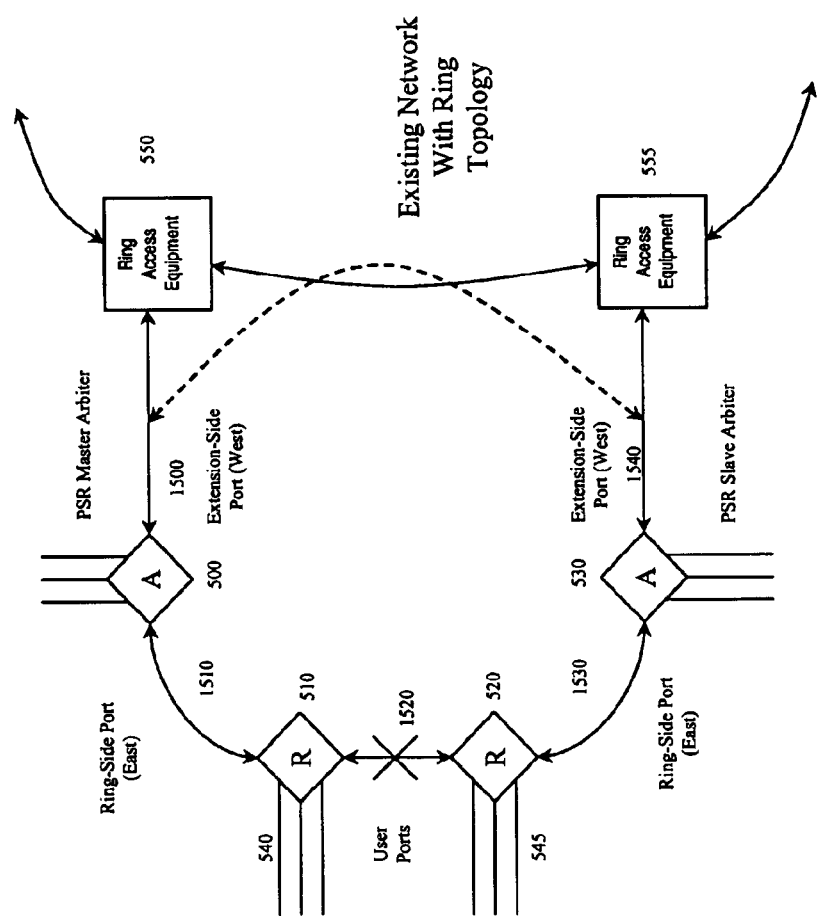
FIG. 5 shows an example Protected Switching Ring in the High Availability mode during a failure.

FIG. 4 shows a HA ring under normal fault-free operation. The ES slave port 1440 is in the BLOCKING state to prevent a ring loop. FIG. 5 shows a HA ring where the link 1520, between nodes 510 and 520, fails. As for the full ring case, the bidirectional failure of link 1520 means that the Ring Arbiter nodes 500 and 530 are unable to communicate over the left side (Ring Side) portion of the HA ring. Assuming Ring Arbiter node 530 is the slave, its ES port (the port facing link 1540) would be un-blocked when the failure is detected. Fault detection and subsequent un-blocking of the slave Ring Arbiter port is fundamentally the same as for the full ring case described above.

Link Restoral

In a preferred embodiment, the HA ring favors the Ring Side once the fault is removed. Instead of leaving the slave Ring Arbiter ES port (the port facing link 1540) in the forwarding state and blocking the Ring Side port (the port facing link 1530), the HA slave Ring Arbiter 530 always returns to a FORWARDING state on the Ring Side segment and blocks the ES port.

The Ring Side segment of the HA ring is favored in order to minimize HA ring traffic on the existing SONET or RPR ring as this will cut some of the user traffic on the SONET ring segment between the Ring Access Equipment as one direction will be blocked (thus counterclockwise traffic from port 1440 will be blocked while clockwise traffic from 1400 will continue to travel on the SONET Ring.

Nomenclature for State Diagrams

In the following descriptions, "isMaster" is based on the last received HELLO. If no HELLO was ever received on the port, then isMaster is based on the partner's last HELLO. If no HELLOs have ever been received by either port, then isMaster is "true". The Boolean variable "isSlave" is the logical negation of "isMaster".

The term "PartnerHelloTimeout" indicates that the partner port's age timer has timed out. The designation "RxHello<Node" means a HELLO message has been received whose priority is less than that of the receiving node. This event would cause the receiving node to consider itself a master.

Full Ring Mode—Ring Arbiter

Figure 6:
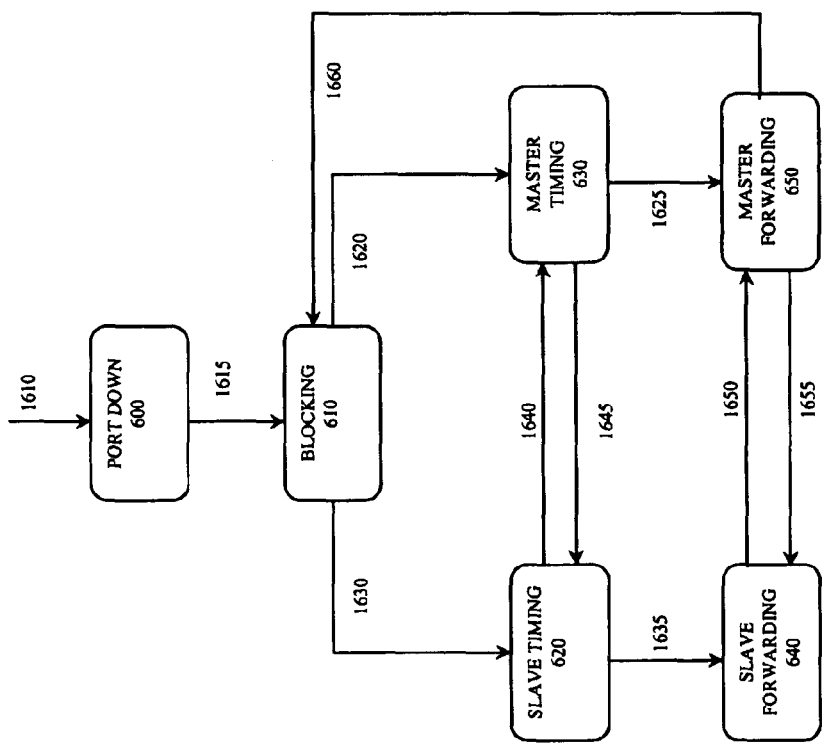
FIG. 6 shows the state machine for a Ring Arbiter node in the Full Ring mode.

FIG. 6 shows the state diagram for a RA node. Each of the two ports on an RA node runs a copy of this state machine.

Description of States

The state machine of FIG. 6 has the following states.

TABLE A

| Number | State | Description |
| --- | --- | --- |
| 600 | PORT DOWN | The port is operationally down or has just been initialized Entered from any state. |
| 610 | BLOCKING | The node is sending HELLOs, but not forwarding data traffic. |
| 620 | SLAVE TIMING | Node knows that it is a slave, but port is waiting for a timer to expire before moving to a forwarding state. |
| 630 | MASTER TIMING | Node knows that it is a master, but port is waiting for a timer to expire before moving to a forwarding state. |
| 640 | SLAVE FORWARDING | The port on a Slave Node is forwarding packets |
| 650 | MASTER FORWARDING | The port on a Master Node is forwarding packets |

Description of State Transitions

The table below describes the transitions of the state machine shown in FIG. 6.

Note the fd timer reference below runs using a time that is a small fraction of the time used for the age timers in the RA and Relay nodes. This ensures that the relays are timed for a period long enough after the expiration of the fd timer for the loop to be broken. For example, one embodiment uses a 10 millisecond timer for the RA and Relay nodes and the fd timer at just one "tick" (a single 10 millisecond delay). This 10 millisecond interval is a small fraction of the 30 millisecond interval used to detect a ring timeout when a new HELLO message does not arrive within that interval.

Note that the state machine for ring arbiters in the preferred embodiment does not wait indefinitely to see a HELLO as long as the ports of the ring arbiter are operationally UP. The goal is to let the parts of the network ring operate even if other portions of the network ring cannot operate.

TABLE B

| Num | Event | Action |
|---|---|---|
| 1610 | port operationally down OR init | block user traffic, cancel all timers |
| 1615 | port operationally up | start age timer |
| 1620 | age timer expires OR RxHello < Node | start fd timer |
| 1625 | fd timer expires | restart age timer, forward user traffic |
| 1630 | RxHello > Node | start fd timer |
| 1635 | fd timer expires AND partner not SLAVE FORWARD | restart age timer, forward user traffic |
| 1640 | age timer expires OR RxHello < Node | restart fd, age timer |
| 1645 | RxHello > Node | restart fd timer |
| 1650 | Age timer expires OR RxHello < Node | restart age timer |
| 1655 | RxHello > Node AND partner not SLAVE FORWARD | restart age timer |
| 1660 | RxHello > Node AND partner SLAVE FORWARD | restart age timer |

The following table shows the complete state transitions for the Full-Ring Arbiter as shown FIG. 6.

In a preferred embodiment, every 10 milliseconds, the two ports are checked in the same order. The combination of variations in when the HELLOs were generated plus transit delays may cause one HELLO on one port to arrive before the other HELLO on the other port. In any case, since one port is checked before the other then the other, it always appears as though one HELLO arrives before the other. The order that the ports are checked does affect which slave port is set to BLOCKING on the full ring.

One of skill in the art will recognize that any embodiment that does not check one port before the other would need to address the case of two HELLOs arriving essentially simultaneously at the two ports.

TABLE C

| Current State Event | PORT DOWN 600 | BLOCKED 610 | SLAVE TIMING 620 | MASTER TIMING 630 | SLAVE FORWARDING 640 | MASTER FORWARDING 650 |
|---|---|---|---|---|---|---|
| Oper Down | N/A | PORT DOWN | PORT DOWN | PORT DOWN | PORT DOWN | PORT DOWN |
| Oper Up | BLOCKED | N/A | N/A | N/A | N/A | N/A |
| Current State | | | | | | |
| Age Timer Expires | N/A | MASTER TIMING | MASTER TIMING | MASTER TIMING | MASTER FORWARDING | MASTER FORWARDING |
| fd Timer Expires | N/A | N/A | N/A | MASTER FORWARDING | N/A | N/A |
| fd timer Expires AND Partner SLAVE FORWARDING | N/A | N/A | SLAVE TIMING | N/A | N/A | N/A |
| fd Timer Expires AND Partner not SLAVE FORWARDING | N/A | N/A | SLAVE FORWARDING | N/A | N/A | N/A |
| RxHello < Node | N/A | MASTER TIMING | MASTER TIMING | MASTER TIMING | MASTER FORWARDING | MASTER FORWARDING |
| RxHello ≧ Node | N/A | SLAVE TIMING | SLAVE TIMING | SLAVE TIMING | N/A | N/A |
| RxHello ≧ Node AND Partner SLAVE FORWARDING | N/A | N/A | N/A | N/A | N/A | BLOCKED |
| RxHello ≧ Node AND Partner not SLAVE FORWARDING | N/A | N/A | N/A | N/A | SLAVE FORWARDING | SLAVE FORWARDING |

TABLE D

| Time | Port A | Input | State Change | Port B | Input | State Change |
|---|---|---|---|---|---|---|
| 1 | Port Down | Port up | 1615 to Blocking | Port Down | Port up | 1615 to Blocking |
| | HELLOs generated by other RA and sent towards ports A and B of this RA. One HELLO arrives slightly before the other. | | | | | |
| 2 | Blocking | RxHello > node | 1630 to Slave Timing | Blocking | | |
| 3 | Slave Timing | | | Blocking | RxHello > node | 1630 to Slave Timing |
| 4 | Slave Timing | fd timer expires and | 1635 to SLAVE | Slave Timing | | |

TABLE D-continued

| Time | Port A | Input | State Change | Port B | Input | State Change |
|---|---|---|---|---|---|---|
| | | partner not SLAVE FORWARD | FORWARD | | | |
| 5 | Slave forward | | | Slave Timing | [cannot advance to Slave Forward as partner is in Slave Forward] | |
| 6 | Link breaks | | | | | |
| 7 | Slave Forward | Link breaks, age timer expires | 1650 to Master Forwarding | Slave Timing | | |
| 8 | Master Forward | | | Slave Timing | fd timer expires and partner not SLAVE FORWARD | 1635 to SLAVE FORWARD |
| 9 | Master Forward | | | Slave Forward | | |
| 10 | Link Restored | | | | | |
| 11 | Master Forward | RxHello > Node and partner Slave Forward | 1660 to Blocking | Slave Forward | | |
| 12 | Blocking | RxHello > Node | 1630 to Slave Timing | Slave Forward | | |

This continues until a port goes down, a link goes down, or the node number of the other RA changes to become less than Node (normally this would take a reconfiguration from the operator or the substitution of another RA unit).

Full Ring Mode—Ring Relay

Figure 7:
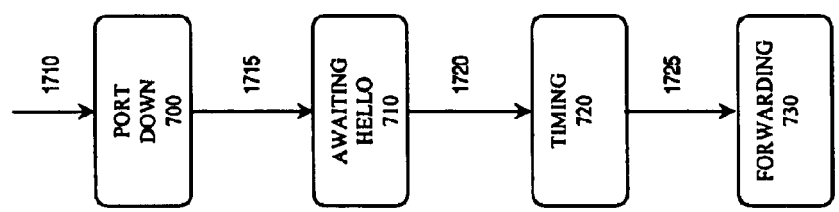
FIG. 7 shows the state machine for a Ring Relay node in the Full Ring mode.

FIG. 7 shows the state machine for a Ring Relay node.

Description of States

The state machine of FIG. 7 has the following states.

TABLE E

| Number | State | Description |
|---|---|---|
| 700 | PORT DOWN | The port is operationally down or has just been initialized. Entered from any state on an indication of the port going down due to a loss of signal or other similar alarm. |
| 710 | AWAITING HELLO | Port is operationally up, but no HELLO has been received |
| 720 | TIMING | The port is waiting for the fd timer to expire |
| 730 | FORWARDING | Normal forwarding. |

Description of State Transitions

The table below describes the transitions of the state machine shown in FIG. 7.

TABLE F

| Number | Event | Action |
|---|---|---|
| 1710 | port operationally down OR init | block user traffic, cancel all timers |
| 1715 | port operationally up | start age timer |
| 1720 | age timer expires OR RxHello | start fd timer |
| 1725 | fd timer expires | forward user traffic |

High Availability Mode—Ring Arbiter—Ring Side

Figure 8:
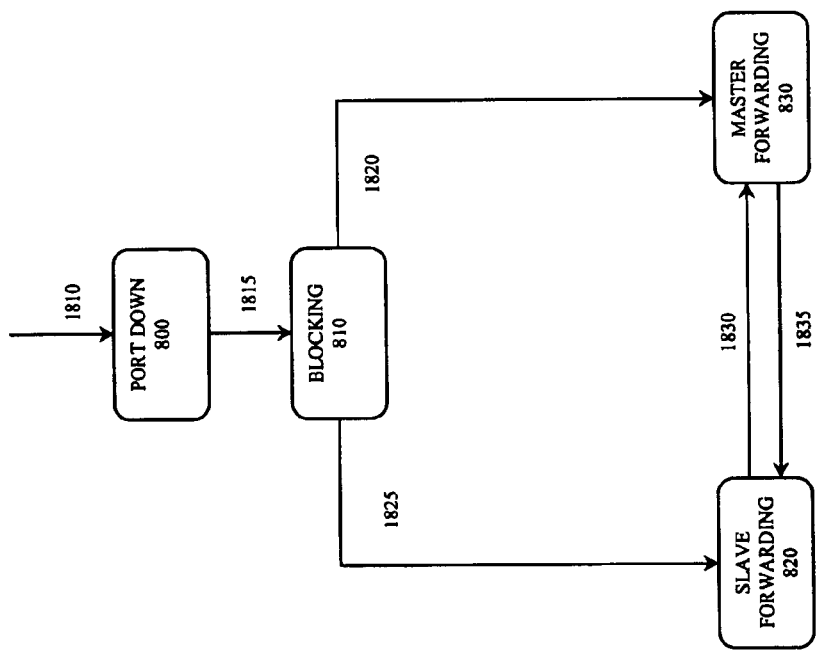
FIG. 8 shows the state machine for the Ring Side of a Ring Relay node in the High Availability mode.

FIG. 8 shows the state machine for the Ring Side (RS) of a Ring Arbiter in HA mode.

Description of States

The state machine of FIG. 8 has the following states.

TABLE G

| Number | State | Description |
|---|---|---|
| 800 | PORT DOWN | The port is operationally down or has just been initialized. Entered from any state. |
| 810 | BLOCKING | The port is sending HELLOs, but is not forwarding data traffic. |
| 820 | SLAVE FORWARDING | The port on a Slave Node is forwarding packets |
| 830 | MASTER FORWARDING | The port on a Master Node is forwarding packets |

Description of State Transitions

The table below describes the transitions of the state machine shown in FIG. 8.

TABLE H

| Number | Event | Action |
|---|---|---|
| 1810 | port operationally down OR init | block user traffic, cancel age timer |
| 1815 | port operationally up | start age timer |
| 1820 | (age timer expires AND isMaster) OR RxHello < Node | forward user traffic |
| 1825 | (age timer expires AND isSlave) OR RxHello > Node | forward user traffic |
| 1830 | RxHello < Node | No action |
| 1835 | RxHello > Node | No action |

High Availability Mode—Ring Arbiter—Extension Side

Figure 9:
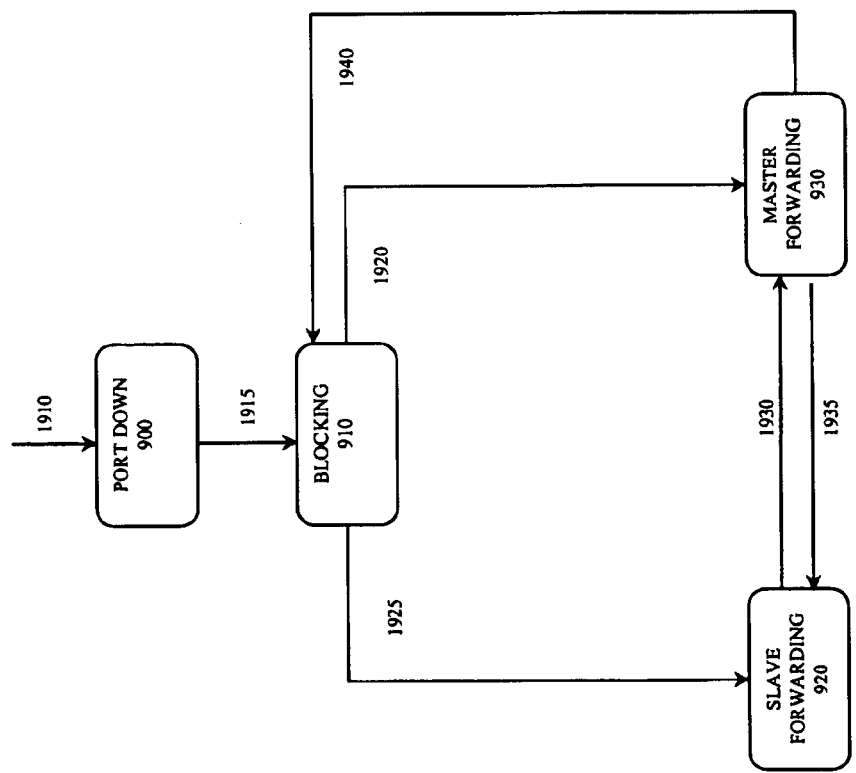
FIG. 9 shows the state machine for the Extension Side of a Ring Relay node in the High Availability mode.

FIG. 9 shows the state machine for the Extension Side (ES) of a Ring Arbiter in HA mode.

Description of States

The state machine of FIG. 9 has the following states.

TABLE I

| Number | State | Description |
|---|---|---|
| 900 | PORT DOWN | The port is operationally down or has just been initialized. Entered from any state. |
| 910 | BLOCKING | The node is sending HELLOs, but not forwarding data traffic. |
| 920 | SLAVE FORWARDING | The port on a Slave Node is forwarding packets |
| 930 | MASTER FORWARDING | The port on a Master Node is forwarding packets |

Description of State Transitions

The table below describes the transitions of the state machine shown in FIG. 9.

TABLE J

| Number | Event | Action |
|---|---|---|
| 1910 | port operationally down OR init | block user traffic, cancel age timer |
| 1915 | port operationally up | start age timer |
| 1920 | (age timer expires AND isMaster) OR RxHello < Node | forward user traffic |
| 1925 | (age timer expires AND isSlave) | forward user traffic |
| 1930 | RxHello < Node | continue forwarding user traffic |
| 1935 | RxHello > Node AND PartnerHello Timeout | continue forwarding user traffic |
| 1940 | RxHello > Node AND NOT PartnerHello Timeout | block user traffic, start age timer |
| 1945 | RxHello > Node AND NOT PartnerHello Timeout | block user traffic, start age timer |

As shown in the sequence of events reported in the table below, the RS ports of the Arbiters are always forwarding, unless the ports are OPER DOWN. The point of interest is the state of the ES port of the slave Arbiter. In essence, the ES slave port is FORWARDING if there is a HELLO timeout on either the RS or ES.

TABLE K

| | Port Status (before trigger) | | | | | |
|---|---|---|---|---|---|---|
| TIME | 500 RS | 500 ES | 530 RS | 530 ES | Trigger | Reaction |
| 1 | 800 | 900 | 800 | 900 | 500 initialized | 500 RS goes Blocking, 500 ES Goes to Blocking |
| 2 | 810 | 910 | 800 | 900 | 530 initialized | 530 RS goes Blocking, 530 ES Goes to Blocking |
| 3 | 810 | 910 | 810 | 910 | 500 receives HELLO from 530 and RxHello < node | 500 RS state change 1820 to Master Forwarding; 500 ES state change 1920 to Master Forwarding |
| 4 | 810 | 910 | 830 | 930 | 530 received HELLO from 500 and RxHello > node | 530 RS state change 1825 to Slave Forwarding; 530 ES does not leave Blocking unless RS or ES has HELLO timeout |
| 5 | 820 | 910 | 830 | 930 | | Continues operation with the virtual break in the HA ring at the ES of the slave (RA 500). |
| 6 | 820 | 910 | 830 | 930 | Break in link 1520 (ring side) | |
| 7 | 820 | 910 | 830 | 930 | RxHellos stop coming on RS | 500 RS no change; 530 ES state change 1925 to Slave Forwarding |
| 8 | 820 | 920 | 830 | 930 | | All four ports forward traffic while there is a physical break |
| 9 | 820 | 920 | 830 | 930 | Break fixed | |
| 10 | 820 | 920 | 830 | 930 | RxHello received at 530 RS and > node | 530 ES state change 1945 to blocking |
| 11 | 820 | 920 | 830 | 930 | | Continues operation with virtual break. |
| 12 | 820 | 910 | 830 | 930 | Link break ES | |
| 13 | 820 | 910 | 830 | 930 | HELLOs stop on ES side of both RA units | 530 ES notes that its age timer expires and it isSlave and has state change 1925 to slave forwarding |
| 14 | 820 | 920 | 830 | 930 | | All four ports forward traffic while there is a physical break |
| 15 | 820 | 920 | 830 | 930 | Break fixed | |
| 16 | 820 | 920 | 830 | 930 | 530 ES receives RxHellos > node and not PartnerHelloTimeout | 530 ES moves along state transition 1945 to Blocking |
| 17 | 820 | 910 | 830 | 930 | | Until next break, port down, or switch in node numbers sufficient to change master/slave relationship. |

ALTERNATIVE EMBODIMENTS

Unidirectional Break

The control system described above assumes that a break in a network ring will be a bidirectional break as it connects both the clockwise and counterclockwise virtual breaks upon failure to receive a HELLO. This bidirectional response could cause a loop in the event of a unidirectional failure.

Figure 2:
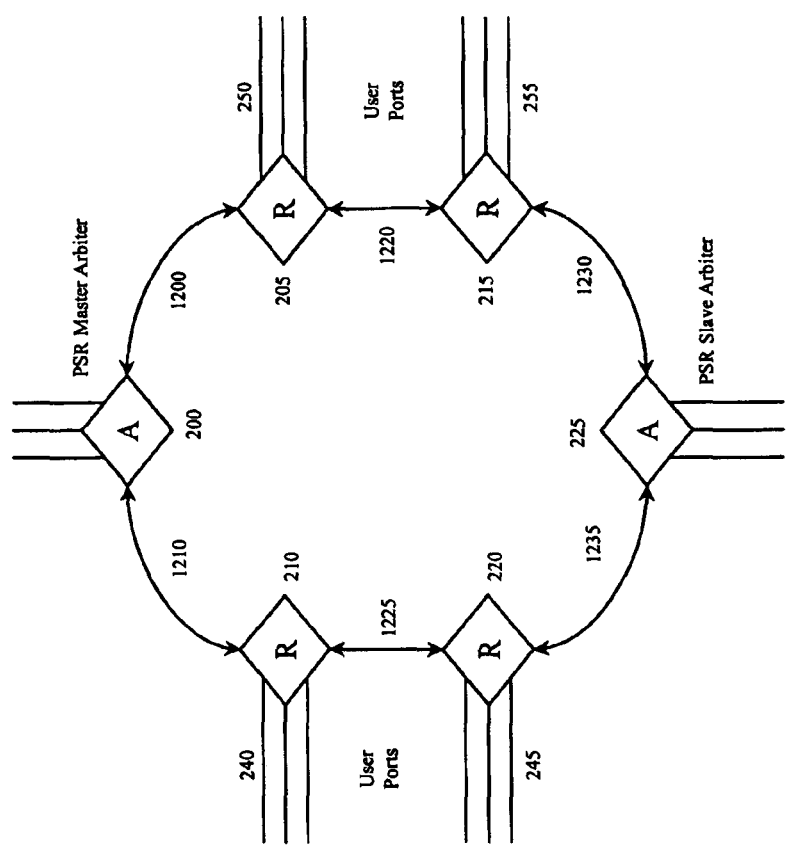
FIG. 2 shows an example Protected Switching Ring in the Full Ring mode in normal operation.
Figure 10:
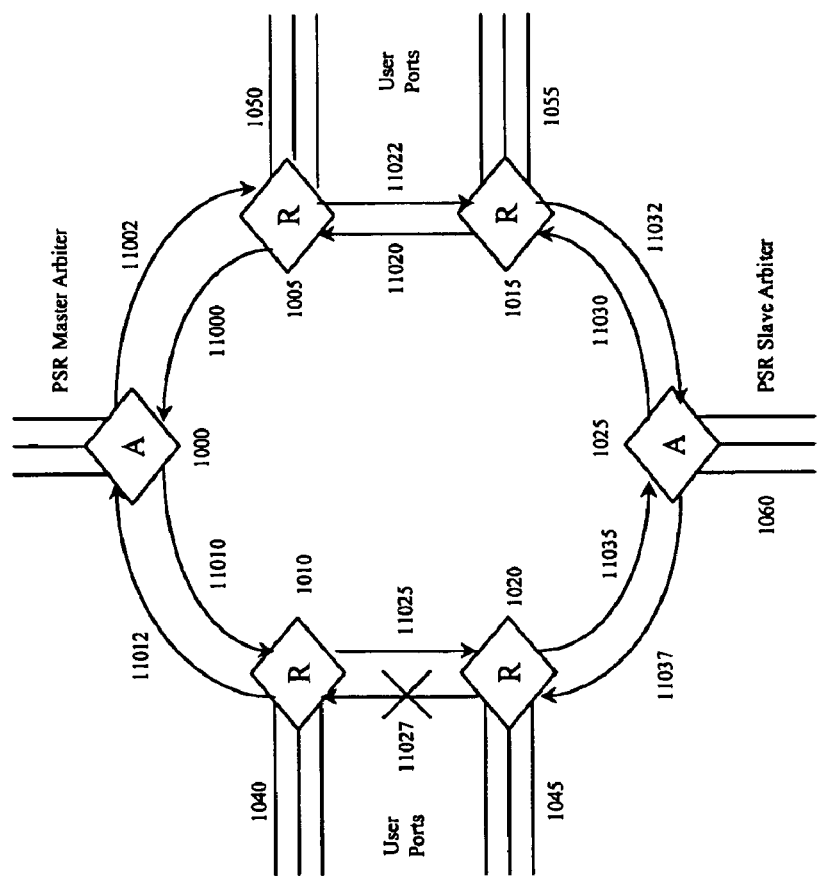
FIG. 10 illustrates a unidirectional ring break.

FIG. 10, adds additional detail to the drawing shown in FIG. 2. More specifically, the links are shown in their unidirectional components rather than as bidirectional links.

For example, when the network ring is fully operational, Master Arbiter 1000 can receive HELLOs from Slave Arbiter 1025 via link 11037, relay 1020, link 11027, relay 1010, and link 11012. Likewise, Slave Arbiter 1025 can receive HELLOs from Master Arbiter 1000 via link 11010, relay 1010, link 11025, relay 1020, and link 11035.

If link 11027 was cut but link 11025 was left in service, then the West port on Master Arbiter 1000 would soon stop receiving HELLOs from Slave Arbiter 1025, while Slave Arbiter 1025 continued to receive HELLOS from Master Arbiter 1000. In the previously described embodiment, this unidirectional cut at link 11027 would not trigger the Slave Arbiter 1025 to unblock as it continues to receive HELLOs from Master Arbiter 1000 across intact link 11025. Thus ring relay 1020 as well as connected subscriber ports 1045 would be cut off from the east side of the ring as Slave Arbiter 1025 is still blocking data, including data that would otherwise travel from Slave Arbiter 1025 to ring relay 1020.

One alternative embodiment is to react to a port going to an OPER DOWN state by stopping the transmission of HELLOs and all data from that port in the opposite direction, effectively creating a virtual unidirectional break in the other direction. Hence when ring relay 1010 observes an OPER DOWN associated with link 11027, ring relay 1010 would stop sending HELLOs and all data on link 11025. After Slave Arbiter 1025 fails to receive HELLOs in an allotted time, the Slave Arbiter 1025 would remove the virtual break on its west side to allow data traffic from link 11035 to proceed towards link 11030 or the user ports 1060 and to allow traffic from link 11032 or user ports 1060 to proceed onto link 11037.

Dual Homing Using a Single Node Ring

Figure 11:
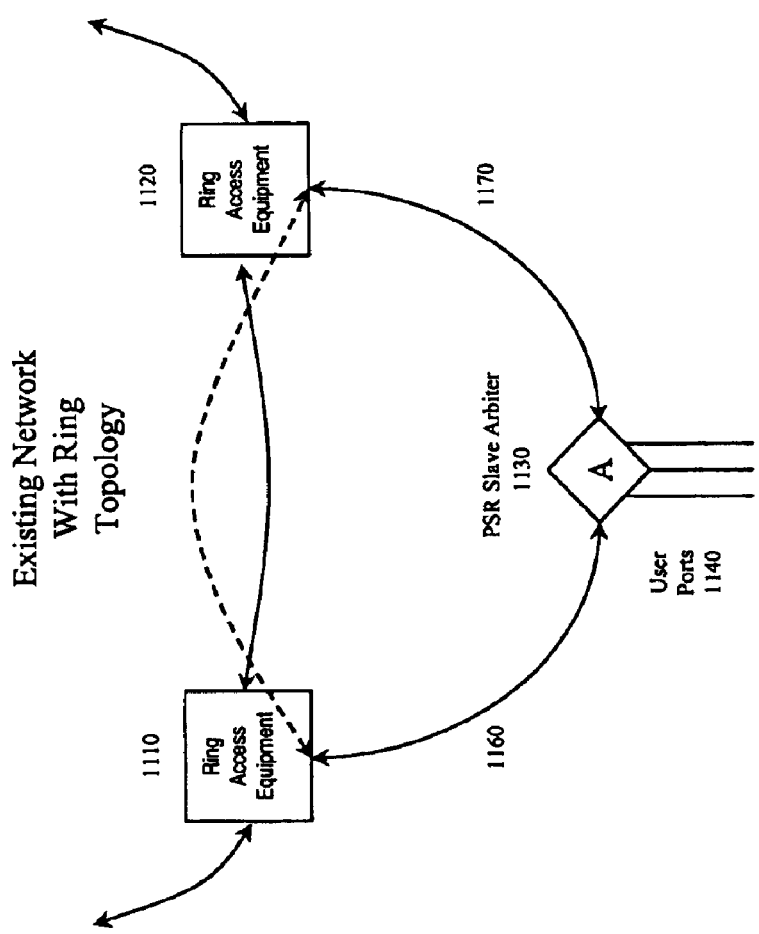
FIG. 11 shows the "Dual Homing" embodiment providing User Ports 1140 with redundant links to the existing network.

FIG. 11 shows an application of a particular embodiment of the present invention that is referred to as "dual homing". Dual homing allows a Slave Arbiter Node 1130 to provide protected access for User Ports 1140 to network via Ring Access Equipment nodes 1110 and 1120 using redundant links 1160 and 1170.

In this alternative embodiment, the Slave Arbiter node 1130 would see its own HELLOs. As described in Table C, one side of 1130 (for example the West side of the Slave Arbiter connected to link 1160) would go to the SLAVE FORWARDING state and one side (for example, the East side of the Slave Arbiter connected to link 1170) would go to the BLOCKED state.

Now, in response to a fault on the Ring Access Equipment 1110 or the link 1160, the East side of the Slave Arbiter 1130 would unblock, and the User Ports 1140 would continue to have access to the network. The network access for User Ports 1140 is therefore protected against faults in either the access links (1160 and 1170) as well as in the Ring Access Equipment nodes (1110 and 1120).

The preferred embodiments disclose using a timing delay to ensure that a port progressing from OPER DOWN to operational delays sending data packets long enough for the slave arbiter to impose a virtual break. One of skill in the art will recognize that the use of the timer could be replaced by a control signal sent by the slave arbiter after it has successfully imposed the virtual break.

One of skill in the art will recognize that alternative embodiments set forth above are not universally mutually exclusive and that in some cases alternative embodiments can be created that implement two or more of the variations described above.

Those skilled in the art will recognize that the methods and apparatus of the present invention have many applications and that the present invention is not limited to the specific examples given to promote understanding of the present invention. Moreover, the scope of the present invention covers the range of variations, modifications, and substitutes for the system components described herein, as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

| ACRONYMS | |
|---|---|
| ES | Extension Side |
| FR | Full Ring |
| HA | High Availability |
| IP | Internet Protocol |
| MAC | Media Access Control |
| MPLS | Multiprotocol Label Switching |
| PDU | Packet Data Unit |
| PSR | Protected Switching Ring |
| RA | Ring Arbiter |
| RPR | Resilient Packet Ring |
| RR | Ring Relay |
| RS | Ring Side |
| TCP | Transmission Control Protocol |
| UDP | User Datagram Protocol |

We claim:

1. A network ring that is manipulated to provide a virtual break in order to operate within a network requiring a tree topology, the network carrying data packets, the network ring comprising:
   A) a master arbiter comprising:
      a MA East port;
      a MA West port; and
   B) a Slave Arbiter comprising:
      a SA East Port normally connected to the MA East Port by a full duplex communication connection;
      a SA West port normally connected to the MA West Port by a full duplex communication connection;
      a SA control system;
      the SA control system comprising controls over the introduction and removal of a virtual break to prevent the formation of a communication ring for data packets within the network requiring a tree topology through the use of at least one non-forwarding state wherein control traffic is forwarded but data packets are not forwarded; the SA control system comprising:
         at least one rule causing the operation of a SA Port in a slave-forwarding state wherein the port forwards data packets and control traffic received at the port;
         at least one rule causing the operation of a SA Port in one of at least one non-forwarding states wherein control traffic is forwarded but data packets are not forwarded;

at least one rule causing the Slave Arbiter to operate when the ring is fully operational such that one SA Port is in a slave-forwarding state and the other SA Port is in a non-forwarding state wherein control traffic is forwarded but data packets are not forwarded;

at least one rule for changing the state of the Slave Arbiter to have both the SA East Port and the SA West port acting to forward data packets after a functional break in the network ring is discerned; and at least one rule for changing the state of one of the two SA Ports to a non-forwarding state wherein control traffic is forwarded but data packets are not forwarded after detection that the functional break has been removed.

2. The network ring of claim 1 further comprising:

C) at least one East Side Ring Relay on the ring segment between the MA East Port and the SA East Port;

the at least one East Side Ring Relay comprising two network ring ports and at least one user port in data communication with the network ring through the East Side Ring Relay;

D) a First Ring Relay Port on an East Side Ring Relay directly linked to the MA East Port, the First Ring Relay Port having a partner port on the Slave Arbiter Side of the East Side Ring Relay with the First Ring Relay Port; and E) a Second Ring Relay port on an East Side Ring Relay directly linked to the SA East Port; the Second Ring Relay Port having a partner port on the Master Arbiter Side of the East Side Ring Relay with the Second Ring Relay Port; wherein the First Ring Relay Port is the partner port to the Second Ring Relay Port when there is only one East Side Ring Relay;

the operation of the network ring further characterized by:

the First Ring Relay Port relaying to the Master Arbiter's MA East Port data packets received from its partner port that are not directed to exit over one of the at least one user ports are sent out the first port;

the Second Ring Relay Port relaying to the Slave Arbiter's SA East Port data packets received from its partner port that are not directed to exit over one of the at least one user ports are sent out the first port;

each of the at least one East Side Ring Relay relaying data packets received from the at least one Subscriber Port connected to that East Side Ring Relay out both ring ports;

the First Ring Relay Port ceasing forwarding data packets upon detection of a functional break between the First Ring Relay Port and the Master Arbiter's MA East Port;

the First Ring Relay Port resuming forwarding data packets after the detection of the removal of the functional break between the First Ring Relay Port and the Master Arbiter's MA East Port; the resumption delayed by a delay period sufficient to allow the Slave Arbiter to create a virtual break to prevent formation of a communication ring;

the Second Ring Relay Port ceasing forwarding data packets upon detection of a functional break between the Second Ring Relay Port and the Slave Arbiter's SA East Port; and the Second Ring Relay Port resuming forwarding data packets after the detection of the removal of the functional break between the Second Ring Relay Port and the Slave Arbiter's SA East Port, the resumption delayed by a delay period sufficient to allow the Slave Arbiter to create a virtual break to prevent the formation of a communication ring.

3. The network ring of claim 1 further comprising:

C) at least one West Side Ring Relay on the ring segment between the MA West Port and the SA West Port;

the at least one West Side Ring Relay comprising two network ring ports and at least one user port in data communication with the network ring through the West Side Ring Relay;

D) a First Ring Relay Port on an West Side Ring Relay directly linked to the MA West Port, the First Ring Relay Port having a partner port on the Slave Arbiter Side of the West Side Ring Relay with the First Ring Relay Port; and E) a Second Ring Relay port on an West Side Ring Relay directly linked to the SA West Port; the Second Ring Relay Port having a partner port on the Master Arbiter Side of the West Side Ring Relay with the Second Ring Relay Port; wherein the First Ring Relay Port is the partner port to the Second Ring Relay Port when there is only one West Side Ring Relay;

the operation of the network ring further characterized by:

the First Ring Relay Port relaying to the Master Arbiter's MA West Port data packets received from its partner port that are not directed to exit over one of the at least one user ports are sent out the first port;

the Second Ring Relay Port relaying to the Slave Arbiter's SA West Port data packets received from its partner port that are not directed to exit over one of the at least one user ports are sent out the first port;

each of the at least one West Side Ring Relay relaying data packets received from the at least one Subscriber Port connected to that West Side Ring Relay out both ring ports;

the First Ring Relay Port ceasing forwarding data packets upon detection of a functional break between the First Ring Relay Port and the Master Arbiter's MA West Port;

the First Ring Relay Port resuming forwarding data packets after the detection of the removal of the functional break between the First Ring Relay Port and the Master Arbiter's MA West Port; the resumption delayed by a delay period sufficient to allow the Slave Arbiter to create a virtual break to prevent formation of a communication ring;

the Second Ring Relay Port ceasing forwarding data packets upon detection of a functional break between the Second Ring Relay Port and the Slave Arbiter's SA West Port; and the Second Ring Relay Port resuming forwarding data packets after the detection of the removal of the functional break between the Second Ring Relay Port and the Slave Arbiter's SA West Port, the resumption delayed by a delay period sufficient to allow the Slave Arbiter to create a virtual break to prevent the formation of a communication ring.

4. The network ring of claim 2 further comprising:
F) at least one West Side Ring Relay on the ring segment between the MA West Port and the SA West Port; the at least one West Side Ring Relay comprising two network ring ports and at least one user port in data communication with the network ring through the West Side Ring Relay;
G) a First Ring Relay Port on an West Side Ring Relay directly linked to the MA West Port, the First Ring Relay Port having a partner port on the Slave Arbiter Side of the West Side Ring Relay with the First Ring Relay Port; and
H) a Second Ring Relay port on an West Side Ring Relay directly linked to the SA West Port; the Second Ring Relay Port having a partner port on the Master Arbiter Side of the West Side Ring Relay with the Second Ring Relay Port; wherein the First Ring Relay Port is the partner port to the Second Ring Relay Port when there is only one West Side Ring Relay;
the operation of the network ring further characterized by:
the First Ring Relay Port relaying to the Master Arbiter's MA West Port data packets received from its partner port that are not directed to exit over one of the at least one user ports are sent out the first port;
the Second Ring Relay Port relaying to the Slave Arbiter's SA West Port data packets received from its partner port that are not directed to exit over one of the at least one user ports are sent out the first port;
each of the at least one West Side Ring Relay relaying data packets received from the at least one Subscriber Port connected to that West Side Ring Relay out both ring ports;
the First Ring Relay Port ceasing forwarding data packets upon detection of a functional break between the First Ring Relay Port and the Master Arbiter's MA West Port;
the First Ring Relay Port resuming forwarding data packets after the detection of the removal of the functional break between the First Ring Relay Port and the Master Arbiter's MA West Port; the resumption delayed by a delay period sufficient to allow the Slave Arbiter to create a virtual break to prevent formation of a communication ring;
the Second Ring Relay Port ceasing forwarding data packets upon detection of a functional break between the Second Ring Relay Port and the Slave Arbiter's SA West Port; and
the Second Ring Relay Port resuming forwarding data packets after the detection of the removal of the functional break between the Second Ring Relay Port and the Slave Arbiter's SA West Port, the resumption delayed by a delay period sufficient to allow the Slave Arbiter to create a virtual break to prevent the formation of a communication ring.

5. The network ring of claim 1 wherein the Master Arbiter can operate as a slave arbiter and the Slave Arbiter can operate as a master arbiter and a set at least one control system rules operate to limit the network ring to a single master arbiter at any one time.

6. The network ring of claim 1 wherein the Master Arbiter further comprises at least one Subscriber Port and the data packets received from the at least one Subscriber Port are transmitted out both the MA East Port and the MA West Port.

7. The network ring of claim 1 wherein:
the MA East Port sends a control traffic message of a first type that is conveyed to the SA East Port;
and the SA control system is further characterized by comprising:
at least one rule for changing the state of the Slave Arbiter to have both the SA East Port and the SA West port acting to forward data packets after a functional break in the network ring is discerned; and
a process of discernment comprising monitoring the receipt of the control traffic messages of the first type received at the SA East Port and detecting a gap in the receipt of an incoming control traffic message of the first type at the SA East Port for a period in excess of a first time interval.

8. The network ring of claim 1 wherein:
the data packets within the network ring are forwarded using a switching technique; and
at least one type of control traffic is forwarded using a bridging technique.

9. The network ring of claim 1 wherein:
the data packets within the network ring are forwarded using a switching technique; and
at least one type of control traffic is forwarded using a switching technique.

10. The network ring of claim 1 wherein the control system further comprises an extended delay so that a port recovering from a port down state does not forward data packets until after the execution of the at least one rule for changing the state of one of the two SA Ports to a non-forwarding state wherein control traffic is forwarded but data packets are not forwarded whereby the removal of a functional break does not create a temporary loop for data packets and thus provides a safeguard against the duplication of data packets.

11. A network ring that is manipulated to provide a virtual break in order to operate within a network requiring a tree topology, the network carrying data packets, the network ring comprising:
A) a Slave Arbiter comprising:
a SA East Port normally connected to a first Ethernet device by a full duplex communication connection;
a SA West port normally connected to a second Ethernet device by a full duplex communication connection;
a SA control system;
the SA control system comprising controls over the introduction and removal of a virtual break to prevent the formation of a communication ring for data packets within the network requiring a tree topology through the use of at least one non-forwarding state wherein control traffic is forwarded but data packets are not forwarded; the SA control system comprising:
at least one rule causing the operation of a SA Port in a slave-forwarding state wherein the port forwards data packets and control traffic received at the port;
at least one rule causing the operation of a SA Port in one of at least one non-forwarding states wherein control traffic is forwarded but data packets are not forwarded;
at least one rule causing the Slave Arbiter to operate when the network ring is fully operational such that one SA Port is in a slave-forwarding state and the other SA Port is in a non-forwarding state wherein control traffic is forwarded but data packets are not forwarded;

at least one rule for changing the state of the Slave Arbiter to have both the SA East Port and the SA West port acting to forward data packets after a functional break in the network ring is discerned; and at least one rule for changing the state one of the two SA Ports to a non-forwarding state wherein control traffic is forwarded but data packets are not forwarded after detection that the functional break has been removed.

12. The network ring of claim 11 wherein the first Ethernet device is also the second Ethernet device.

13. A network ring that is manipulated to have at least one virtual break for data packets; the network ring comprising:
a first arbiter acting as Master Arbiter, the Master Arbiter having at least a MA West Port, and a MA East Port;
a second arbiter acting as Slave Arbiter, the Slave Arbiter having at least a SA West Port, and a SA East Port;
a First full duplex communication path between the Master Arbiter and the Slave Arbiter;
a Second full duplex communication path between the Master Arbiter and the Slave Arbiter;
the Master Arbiter and the Slave Arbiter serving as nodes on the network ring;
the Master Arbiter sending out a HELLO protocol packet frequently onto the First full duplex path and on the Second full duplex path;
the Slave Arbiter noting the arrival of the HELLO protocol packets and noting a ring timeout when the interval between arrivals of two sequential HELLO protocol packets on a particular port exceeds a first threshold value;
the Slave Arbiter reacting to a ring timeout by removing at least one virtual break within the Slave Arbiter and communicating data packets received from the First Communication Path to the Second Communication Path and from the Second Communication Path to the First Communication Path; and
the Slave Arbiter reacts to receipt of a HELLO protocol packet from the communication path deemed to have a ring timeout by introducing at least one virtual break so that data packets received from the First Communication Path are not communicated to the Second Communication Path and the data packets received from the Second Communication Path are not communicated to the First Communication Path so that the network ring is not operated to provide a data communication loop.

14. A network ring that is manipulated to have at least one virtual break for data packets; the network ring comprising:
a first arbiter acting as Master Arbiter, the Master Arbiter having at least a MA West Port, and a MA East Port;
a second arbiter acting as Slave Arbiter, the Slave Arbiter having at least a SA West Port, and a SA East Port;
a First full duplex communication path between the Master Arbiter and the Slave Arbiter comprising at least an "A" Ring Relay and a "B" Ring Relay;
a Second full duplex communication path between the Master Arbiter and the Slave Arbiter comprising at least an Initial Ring Relay;
the A Ring Relay, the B Ring Relay and the Initial Ring Relay all comprising a Master Arbiter Side Port, a Slave Arbiter Side Port, and a Subscriber Port;
the Master Arbiter; the Slave Arbiter; and the ring relays serving as nodes on the network ring;
the Master Arbiter sending out a HELLO protocol packet frequently onto the First full duplex path and on the Second full duplex path;
the ring relays passing the HELLO protocol packet from the Master Arbiter Side Port to the Slave Arbiter Side Port;
the Slave Arbiter noting the arrival of the HELLO protocol packets and noting a ring timeout when the interval between arrivals of two sequential HELLO protocol packets on a particular port exceeds a first threshold value;
the Slave Arbiter reacting to a ring timeout by removing at least one virtual break within the Slave Arbiter and communicating data packets received from the First Communication Path to the Second Communication Path and from the Second Communication Path to the First Communication Path; and
the Slave Arbiter reacts to receipt of a HELLO protocol packet from the communication path deemed to have a ring timeout by introducing at least one virtual break so that data packets received from the First Communication Path are not communicated to the Second Communication Path and the data packets received from the Second Communication Path are not communicated to the First Communication Path so that the network ring is not operated to provide a data communication loop.

15. The network ring of claim 14 wherein the Slave Arbiter notes a ring failure when the interval between arrivals of two sequential HELLO protocol packets exceeds a second threshold value, larger than the first threshold value.

16. The network ring of claim 14 wherein the first threshold value is selected to allow the declaration of a ring timeout and removal of at the least one virtual break within the Slave Arbiter in less than 50 milliseconds.

17. The network ring of claim 14 wherein the Slave Arbiter has at least one Subscriber Port and the Slave Arbiter continues to transmit data packets received from at least one Subscriber Port onto the First Communication Path and the Second Communication Path after noting the ring timeout, but after receipt of a HELLO protocol packet from the communication path deemed to have a ring timeout, the Slave Arbiter acts to prevents subsequent retransmission of these data packets by inserting at least one virtual break within the Slave Arbiter.

18. The network ring of claim 17 wherein the nodes closest to a failure in the network ring stop transmitting received data packets towards the failure in the network ring and do not resume transmission of data packets towards the failure in the network ring after correction of the failure until after the Slave Arbiter has an opportunity to insert at least one virtual break.

19. The network ring of claim 14 wherein the HELLO protocol packets are transported within the network ring through use of bridging procedures to direct the HELLO protocol packets to particular nodes on the network ring, but data packets received from user ports are transported around the network ring through the use of a switching technique.

20. The network ring of claim 14 wherein the HELLO protocol packets and data packets are transported within the network ring through use of a switching technique to direct the packets to particular nodes on the network ring.

21. A network node device for selectively creating and removing at least one virtual break in a network ring; the node device comprising:
a first ring connection and a second ring connection for use in connecting the node device to two ends of a network ring;
the node device operation within a network ring characterized by:
initializing so that the node device contains a virtual break to prevent data packets received on the first ring connection from continuing on the second ring connection and data packets on the second data connection from continuing on the first ring connection; creating and transmitting a series of HELLO protocol packets out the first ring connection and the second ring connection wherein HELLO protocol packets are addressed in the such a way that the HELLO protocol packets pass through any relay nodes located between the network node device and a device intended to process HELLO protocol packets while monitoring for actual breaks in the network ring;

receiving HELLO protocol packets from a device other than itself on the first ring connection and monitoring the interval since the last HELLO protocol packet was received on the first ring connection;

receiving HELLO protocol packets from a device other than itself on the second ring connection and monitoring the interval since the last HELLO protocol packet was received on the second ring connection;

discerning the existence of a break in the network ring by detecting an interval in excess of a first value since the receipt of the last HELLO packet on the first ring connection;

discerning the existence of a break in the network ring by detecting an interval in excess of a second value since the receipt of the last HELLO packet on the second ring connection where the second value can equal the first value;

responding to the discernment of the existence of a break in the network ring by removing the at least one virtual break within the node device;

detecting the resumed receipt of a HELLO protocol packet on a ring connection used to discern a break in the network ring, and concluding the discerned break is gone; and introducing at least one virtual break within the node device after concluding that the discerned break is gone.

22. The node device of claim 21 wherein the node device inspects incoming HELLO protocol packets to discern whether the node device has the duty of selectively imposing at least one virtual break or whether that duty is given to a device other than itself.

23. The node device of claim 21 wherein the node device does use dynamic layer 2 learning tables for transmitting data packets.

24. The node device of claim 21 further comprising at least one user port wherein:

during a period when the node device has imposed a virtual break, there is only one path for data packets to travel from the network ring to egress the network ring to the at least one user port;

during the period when the node device has imposed a virtual break, there is only one path for data packets to travel from the at least one user port to the network ring; and during a period when the node device has removed the virtual break, data packets arriving at the node device from one of the at least one user port are sent out both the first ring connection and the second ring connection independent of any information learned from previous transmissions.

25. The node device of claim 24 wherein:

the data packets received at the node device from the at least one user port are modified to add a ring tag specifying a connection between two ring nodes; and the data packets received at the node device from the network ring where the data packets are destined for one of the at least one user ports on the node device are stripped of the ring tag added to the data packet at the node where the data packet entered the network ring.

26. The node device of claim 21 wherein the at least one virtual break is always placed on the first ring connection so that:

data packets destined for the at least one user port on the node device reach the user port through the second ring connection when the at least one virtual break is imposed;

data packets from the at least one user port are transmitted exclusively on the second ring connection when the at least one virtual break is imposed; and at least one type of network control packet is sent out of the first ring connection even when the at least one virtual break is imposed in the node device.

27. A ring relay for use in a network ring that is manipulated to provide a virtual break in order to operate within a network requiring a tree topology, the network ring carrying data packets; the ring relay comprising the following attributes:

having a first ring port and a second ring port connected to the network ring;

detecting a type of network ring failure and moving the relevant ring port to a port down state; and delaying resumption of transmission of data packets to the ring port previously moved to a port down state after detecting the removal of the ring failure so that the transition from the port down state to operating is delayed sufficiently to allow another node in the network ring to impose virtual breaks to prevent the formation of a communication loop for data packets.

28. The ring relay of claim 27 further comprising at least one user port connected to the network ring through the ring relay;

the characteristics of the ring relay further comprising:

adding a network ring VLAN tag, unique on the network ring, to any data packet entering the network ring through the ring relay; and removing a network ring VLAN tag, previously added by a network ring node, from any data packet leaving the network ring through the ring relay.

29. The ring relay of claim 28 where data packets received on the ring first port are simply transferred to the second ring port, without modification, if a switch table, based on the network ring VLAN tag, indicates that the ring relay is a transit node for that data packet, rather than an endpoint for that data packet.

30. The ring relay of claim 27 where data packets received on the first ring port are simply transferred to the second ring port, without modification, if a switch table indicates that the ring relay is a transit node for that data packet rather than an endpoint for that data packet.

31. The ring relay of claim 27 wherein the ring relay periodically receives discovery messages on the first ring port and adds information about the ring relay to the discovery message before sending it out the second ring port.

32. The ring relay of claim 31 wherein the ring relay will create a discovery message indicating that the ring relay is the originator of the discovery message and send that discovery message out the second ring port if a discovery message is not received on the first ring port within a specified time interval.

33. The ring relay of claim 31 wherein the ring relay periodically receives hello messages on the first ring port and sends the hello message out the second ring port without processing so that hello messages travel around a portion of the network ring faster than discovery messages travel around that same portion.-

34. A ring relay for use in a network ring that is manipulated to provide a virtual break in order to operate within a network requiring a tree topology, the network ring carrying data packets; the ring relay comprising the following attributes:

having a first ring port and a second ring port connected to the network ring;

detecting a type of network ring failure and moving the relevant ring port to a port down state; and delaying resumption of transmission of data packets to the ring port previously moved to a port down state until after receiving a control signal message from another node indicating the insertion of at least one virtual break to prevent the formation of a communication loop for data packets.

35. A network having a redundant path for increasing the availability of a segment of a network ring, the network comprising:

an existing network ring;

a Master Arbiter at a first access point on the existing network ring;

a Slave Arbiter at a second access point, different from the first access point, on the existing network ring;

a second network ring formed with a ring side and an extension side;

the ring side comprising the Master Arbiter, the Ring Side port on the Master Arbiter, the Ring-Side Port on the Slave Arbiter, and the Slave Arbiter;

the extension side comprising the Master Arbiter, the Extension Side Port on the Master Arbiter; the first access point, the portion of the existing network ring between the first access point and the second access point, the second access point, the Extension Side Port on the Slave Arbiter, and the Slave Arbiter;

the Master Arbiter passing data packets received on the Extension Side Port to the Ring Side Port and the data packets received on the Ring Side Port to the Extension Side Port;

the Slave Arbiter when acting in a blocking mode, blocking the passage of data packets from the Extension Side Port to the Ring Side Port and from the Ring Side Port to the Extension Side Port but forwarding at least one type of control packet from the Extension Side Port to the Ring Side Port and from the Ring Side Port to the Extension Side Port;

the Slave Arbiter when acting in a forwarding mode, forwarding data packets from the Extension Side Port to the Ring Side Port and from the Ring Side Port to the Extension Side Port;

the Master Arbiter and the Slave Arbiter monitoring the performance of the second network ring to detect a failure in the second network ring within a first specified period and switching the Slave Arbiter from acting in a blocking mode to acting in a forwarding mode within a second specified period; and the Slave Arbiter reacting to an indication that the failure in the second network ring has been remedied by switching from acting in forwarding mode to acting in blocking mode; and at least one port on the second network adjacent to the failure in the second network ring noting the failure in the second network ring and switching to a port down mode, the at least one port delaying recovery from a port down condition long enough for the Slave Arbiter to switch from acting in a forwarding mode to acting in a blocking mode to prevent the formation of a communication loop for data packets.

36. The network of claim 35 wherein the total time for:

the actions of the Master Arbiter and the Slave Arbiter monitoring the performance of the second network ring to detect a failure in the network ring within a first specified period and the time required for switching the Slave Arbiter from acting in a blocking mode to acting in a forwarding mode is less than 50 milliseconds.

37. A method of providing a redundant connection for at least one user port for increasing the availability access between the at least one user port and an existing network; the method comprising:

connecting the at least one user port to a slave arbiter node;

connecting a first ring port on the slave arbiter node in bidirectional data communication with a first network access device connected to the existing network;

connecting a second ring port on the slave arbiter node in bidirectional data communication with a second network access device connected to the existing network;

sending HELLO messages out the first ring port to the second ring port via the first network access device and the second network access device;

operating in a blocking mode when the ring comprising the slave arbiter node, the first access device, and the second access device is functioning, wherein blocking mode comprises:

blocking one ring port on the slave arbiter node, by blocking the transmission of data packets from the at least one user port from leaving the blocked ring port to travel to the corresponding access device; and blocking data packets received on the blocked ring port from reaching the at least one user port;

operating in a forwarding mode when the slave arbiter detects a problem with a communication path between the unblocked ring port and the existing network, wherein forwarding mode comprises:

sending data packets received from the at least one user port out the previously blocked ring port; and sending data packets received from the previously blocked ring port to the at least one user port.

38. The method of claim 37 wherein the frequency of HELLO messages is sufficient to allow both the detection of a problem with the communication path between the unblocked port and the existing network and switching from blocking mode to forwarding mode in less than 50 milliseconds.

39. The method of claim 37 wherein HELLO messages are sent out the second ring port to the first ring port via the second network access device and the first network access device.

40. A ring relay for use in a bidirectional network ring that is manipulated to provide a virtual break in order to operate within a network requiring a tree topology, the network ring carrying data packets; the ring relay comprising the following attributes:

having a first ring port in data communication with a first incoming link and a first outgoing link and a second ring port in data communication with a second incoming link and a second outgoing link connected to the network ring; and after detecting a type of network ring failure on the second incoming link, reacting to the detection of the network failure on the second incoming link by blocking the second outgoing link such that a virtual break is imposed on the second outgoing link after detection of a type of network failure on the second incoming link such that HELLO protocol packets received on the first incoming link are not passed to the second outgoing link which then triggers corrective action by the bidirectional network ring to remove an existing virtual break from a device other than the ring relay.

41. A ring relay for use in a bidirectional network ring that is manipulated to provide a virtual break in order to operate within a network requiring a tree topology, the network ring carrying data packets; the ring relay comprising the following attributes:

having a first ring port in data communication with a first incoming link and a first outgoing link and a second ring port in data communication with a second incoming link and a second outgoing link connected to the network ring;

receiving HELLO messages on the first incoming link and passing the HELLO message out the second outgoing link;

receiving data packets on the first incoming link destined for the second outgoing link and passing these data packets to the second outgoing link; and after detecting a type of network ring failure on the second incoming link, reacting to the detection of the network failure on the second incoming link by blocking the HELLO messages received on the first incoming link from passing onto the second outgoing link and blocking data packets received on the first incoming link destined for the second outgoing link from passing to the second outgoing link such that a virtual break is imposed on the second outgoing link after detection of a type of network failure on the second incoming link.

42. A network node device for selectively creating and removing at least one virtual break in a network ring; the node device comprising:

a first ring connection and a second ring connection for use in connecting the node device to two ends of a network ring;

the node device operation within a network ring characterized by:

initializing so that the node device contains a virtual break to prevent data packets received on the first ring connection from continuing on the second ring connection and data packets on the second data connection from continuing on the first ring connection; creating and transmitting a series of HELLO protocol packets out the first ring connection and the second ring connection;

receiving HELLO protocol packets from a device other than itself on the first ring connection and monitoring the interval since the last HELLO protocol packet was received on the first ring connection;

receiving HELLO protocol packets from a device other than itself on the second ring connection and monitoring the interval since the last HELLO protocol packet was received on the second ring connection;

discerning the existence of a break in the network ring by detecting an interval in excess of a first value since the receipt of the last HELLO packet on the first ring connection;

discerning the existence of a break in the network ring by detecting an interval in excess of a second value since the receipt of the last HELLO packet on the second ring connection where the second value can equal the first value;

responding to the discernment of the existence of a break in the network ring by removing the at least one virtual break within the node device;

detecting the resumed receipt of a HELLO protocol packet on a ring connection used to discern a break in the network ring, and concluding the discerned break is gone; and introducing at least one virtual break within the node device after concluding that the discerned break is gone;

further characterized by:

during a period when the node device has imposed a virtual break, there is only one path for data packets to travel from the network ring to egress the network ring to the at least one user port;

during the period when the node device has imposed a virtual break, there is only one path for data packets to travel from the at least one user port to the network ring; and during a period when the node device has removed the virtual break, data packets arriving at the node device from one of the at least one user port are sent out both the first ring connection and the second ring connection;

still further characterized by:

the data packets received at the node device from the at least one user port are modified to add a ring tag specifying a connection between two ring nodes; and the data packets received at the node device from the network ring where the data packets are destined for one of the at least one user ports on the node device are stripped of the ring tag added to the data packet at the node where the data packet entered the network ring.

43. The ring relay of claim 34 further comprising at least one user port connected to the network ring through the ring relay;

the characteristics of the ring relay further comprising:

adding a network ring VLAN tag, unique on the network ring, to any data packet entering the network ring through the ring relay; and removing a network ring VLAN tag, previously added by a network ring node, from any data packet leaving the network ring through the ring relay.

44. The ring relay of claim 43 where data packets received on the ring first port are simply transferred to the second ring port, without modification, if a switch table, based on the network ring VLAN tag, indicates that the ring relay is a transit node for that data packet, rather than an endpoint for that data packet.

45. The ring relay of claim 34 where data packets received on the first ring port are simply transferred to the second ring port, without modification, if a switch table indicates that the ring relay is a transit node for that data packet rather than an endpoint for that data packet.

46. The ring relay of claim 34 wherein the ring relay periodically receives discovery messages on the first ring port and adds information about the ring relay to the discovery message before sending it out the second ring port.

47. The ring relay of claim 46 wherein the ring relay will create a discovery message indicating that the ring relay is the originator of the discovery message and send that discovery message out the second ring port if a discovery message is not received on the first ring port within a specified time interval.

48. The ring relay of claim 46 wherein the ring relay periodically receives hello messages on the first ring port and sends the hello message out the second ring port without processing so that hello messages travel around a portion of the network ring faster than discovery messages travel around that same portion.

* * * * *

UNITED STATES PATENT AND TRADEMARK OFFICE
CERTIFICATE OF CORRECTION

PATENT NO. : 6,928,050 B2  Page 1 of 1
APPLICATION NO. : 10/839864
DATED : August 9, 2005
INVENTOR(S) : Lynch et al.

It is certified that error appears in the above-identified patent and that said Letters Patent is hereby corrected as shown below:

Column 16,
Line 45 "master arbiter" should be changed to -- Master Arbiter --.

Column 22, line 62, to Column 23, line 8,
Revise by breaking this text into two paragraphs, the first starting at Column 22, Line 62 with "initializing" and ending with the semicolon found at Column 22, Line 67; the second paragraph starting with "creating" found after "ring" at Column 23, Line 8.

Column 23,
Line 2, "wherein HELLO" should be -- wherein the HELLO --.
Line 3, "in the such" should be -- in such --.

Column 27,
Lines 37-44, needs to be revised by breaking this text into two paragraphs, the first starting at Column 27, line 37 with "initializing" and ending wth the semicolon at Column 27, line 41; the second paragraph starting with "creating" at Column 27, line 41 and ending with the semicolon at Column 27, line 44 after the word "connection".

Signed and Sealed this

Fourth Day of July, 2006

JON W. DUDAS
*Director of the United States Patent and Trademark Office*

UNITED STATES PATENT AND TRADEMARK OFFICE
CERTIFICATE OF CORRECTION

PATENT NO. : 6,928,050 B2  
APPLICATION NO. : 10/839864  
DATED : August 9, 2005  
INVENTOR(S) : Lynch et al.

Page 1 of 2

It is certified that error appears in the above-identified patent and that said Letters Patent is hereby corrected as shown below:

In claim 3, Column 18, Line 16 "on an West Side" should be changed to -- on a West Side --.

In claim 3, Column 18, Line 21 "on an West Side" should be changed to -- on a West Side --.

In claim 4, Column 19, Line 8 "on an West Side" should be changed to -- on a West Side --.

In claim 4, Column 19, Line 13 "on an West Side" should be changed to -- on a West Side --.

In claim 5, Column 19, Lines 61-62 "and a set at least one control system rules" should be changed to -- and a set of at least one control system rules --.

Column 16, Line 45, "master arbiter" should be changed to -- Master Arbiter --.

In claim 17, Column 22, Line 37 "prevents" should be changed to -- prevent --.

In claim 21, Column 22, Line 62 to Column 23, Line 8, the text should be broken into two paragraphs, the first paragraph starting at Column 22, Line 62 with "initializing" and ending with the ";" found at Column 22, Line 67; the second paragraph starting with "creating" found at Column 22, Line 67 and ending with the ";" found after "ring" at Column 23, Line 8.

Column 23, Line 2, "wherein HELLO" should be -- wherein the HELLO --.
Column 23, Line 3, "in the such" should be -- in such --.

Column 27, Lines 37-44, needs to be revised by breaking this text into two paragraphs, the first starting at Column 27, line 37 with "initializing" and ending with the ";" at Column 27, line 41; the second paragraph starting with "creating" at Column 27, line 41 and ending with the ";" at Column 27, line 44 after the word "connection".

This certificate supersedes the Certificate of Correction issued July 4, 2006.

Signed and Sealed this  
Tenth Day of May, 2011

David J. Kappos  
*Director of the United States Patent and Trademark Office*

CERTIFICATE OF CORRECTION (continued)
U.S. Pat. No. 6,928,050 B2

In claim 33, Column 24, Lines 63-65 "hello" appears once on each line. On each line, "hello" should be changed to -- HELLO --.
In claim 33, Column 24, Line 67 the "-" at the end of the claim should be changed to a -- . --.

In claim 44, Column 28, Line 40 "the ring first port" should be changed to -- the first ring port --.

In claim 48, Column 28, Lines 62-64 "hello" appears once on each line. On each line, "hello" should be changed to -- HELLO --.